July 13, 1937.　　　F. C. REGGIO　　　2,087,070
CLUTCH MECHANISM
Filed Aug. 15, 1933　　　2 Sheets-Sheet 1

Inventor.
Ferdinand C. Reggio,
By Sommers & Young
attys.

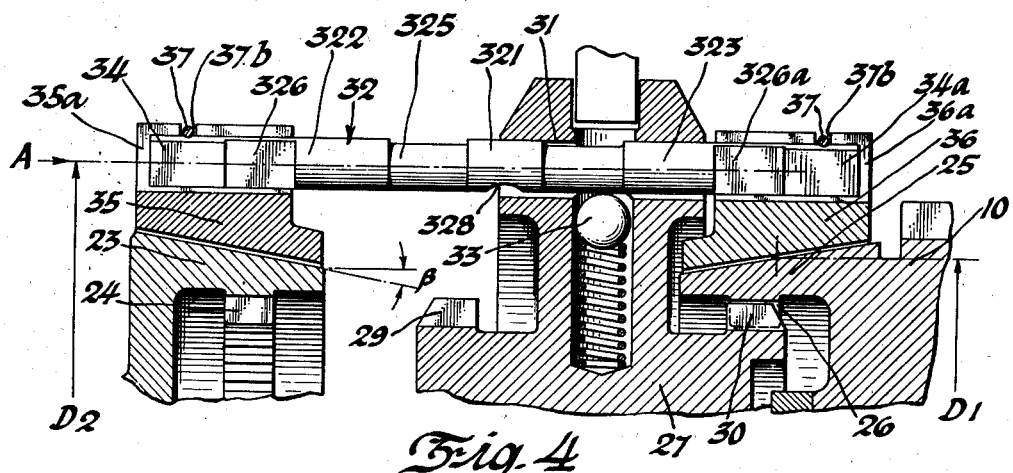

Patented July 13, 1937

2,087,070

UNITED STATES PATENT OFFICE 2,087,070

CLUTCH MECHANISM

Ferdinand Charles Reggio, Paris, France

Application August 15, 1933, Serial No. 685,261
In France August 23, 1932

14 Claims. (Cl. 192—53)

This invention relates to power transmission mechanisms, comprising two co-axial clutch elements, serving to couple positively together the driving and driven members of the transmission gear and an intermediate synchronizing element carried by one of said clutch elements and which can be connected with the other element so as to prevent the coupling of the driving and driven members as long as their speeds are not approximately the same.

As shown by patents and publications of the prior art, it frequently has been proposed to couple positively a driving and a driven member, which may be rotating at different velocities, by first causing said members to rotate with substantially equal velocities by means of a friction clutch and then, while said members are rotating in substantial synchronism, to couple them together in driving relation by positive toothed coupling elements. Composite frictional and positive coupling means of this kind are commonly known in motor vehicle practice as synchronizing transmission mechanisms or synchronizing clutches.

In the patent to Albert No. 1,886,614, there is shown a synchronizing transmission mechanism of a type, sometimes identified as the inertia check type, which comprises a pair of members to be coupled, one of which is rotating freely, a positive clutch having engageable and disengageable elements one of which is axially movable for positively coupling said members, and a friction clutch having one of its elements axially fixed to one member and the other functionally interposed between the elements of the positive clutch and equipped with means whereby it may be pressed forcibly into frictional engagement with its companion by the axial clutch-engaging movement of one of said positive elements, and also obstruct engagement of said positive elements by asserting a resisting force the quantity of which is dependent on the inertia of the freely rotating member when there is a difference of velocity of the positive clutch elements to be interengaged. In this patent the said interposed friction clutch element, sometimes referred to as a synchronizer or intermediate synchronizing element, is drivingly connected to one of the positive clutch elements in such manner as to have a limited angular or rotative movement with respect to the latter; said synchronizer and positive clutch element being provided with cam-like checking surfaces that are brought into axial alignment when the synchronizer is at one limit or the other of its said limited relative angular movement. When said checking surfaces are not in axial alignment the synchronizer and positive clutch element to which it is drivingly connected can move relatively in an axial direction so as to free the friction clutch elements from clutch engaging pressure and permit free engagement of the positive clutch elements.

The object of this invention is to simplify the structure of inertia check synchronizing transmission mechanisms of the type referred to herein.

The invention consists in the combination of driving and driven members, a positive clutch comprising elements adapted to be engaged and disengaged by a relative axial movement, a friction clutch comprising one element fixed rigidly with respect to one of said positive clutch elements and a companion synchronizer element having a lost motion driving connection with the other positive clutch element and also capable of axial movement with respect thereto by means of one or more push rods, each connected to the companion synchronizer in such manner as to allow angular movement of the rod in a plane substantially tangential to the midpoint of its connection with the synchronizer, each of said push rods passing loosely through an axially directed opening or slidable-rod seat formed in said other positive clutch element, there being means to yieldably resist sliding movement of each push rod through its said opening or seat.

Assuming the velocities of the two positive clutch elements to be different, a movement of the slidable positive element toward its companion will move the friction clutch elements into surface contact with sufficient pressure to cause the friction clutch element that is fixed to a positive clutch element to rotate the lost motion connected friction clutch element, or synchronizer, relatively with respect to the positive clutch element to which it is connected, and thus carry along in rotation those parts of each push rod that are connected to it, thus causing each rod to be cramped or wedged in the openings or seats formed to receive them in the other positive clutch element. Under these conditions axial pressure applied to the axially movable positive clutch element tending to move it toward its companion is resisted owing to the cramping or wedging of the push rods. The friction between the friction clutch elements (the synchronizer and its companion) tends to bring the two positive clutch elements to the same speed, one increasing or decreasing the speed of the other. As the difference of speed decreases, the forces of the couple causing the cramping or wedging of the push rods in their slidable seats or openings decrease, and when synchronism is attained they disappear, leaving no force resisting axial advance of the slidable positive clutch element into engagement with its companion excepting the friction of parallel surfaced sliding bodies, the push rods and positive clutch element in which they are seated then sliding freely with respect to one another.

The accompanying drawings show by way of example a construction of a synchronizing device according to this invention used in connection with the top gear, third gear and second gear of a four speed change speed gear for automobiles.

Figure 4 is an axial section showing a fragment of the transmission coupled in third speed;

Figure 5 is a fragmentary section through one synchronizer ring and a slidable clutch element with one push rod cramped in its seat in said clutch element, and viewed from a point radially outward of the transmission, and Figure 6 is a perspective view of one form of push rod showing the flattened inner side and contours of the various portions of the rod.

Figure 1:
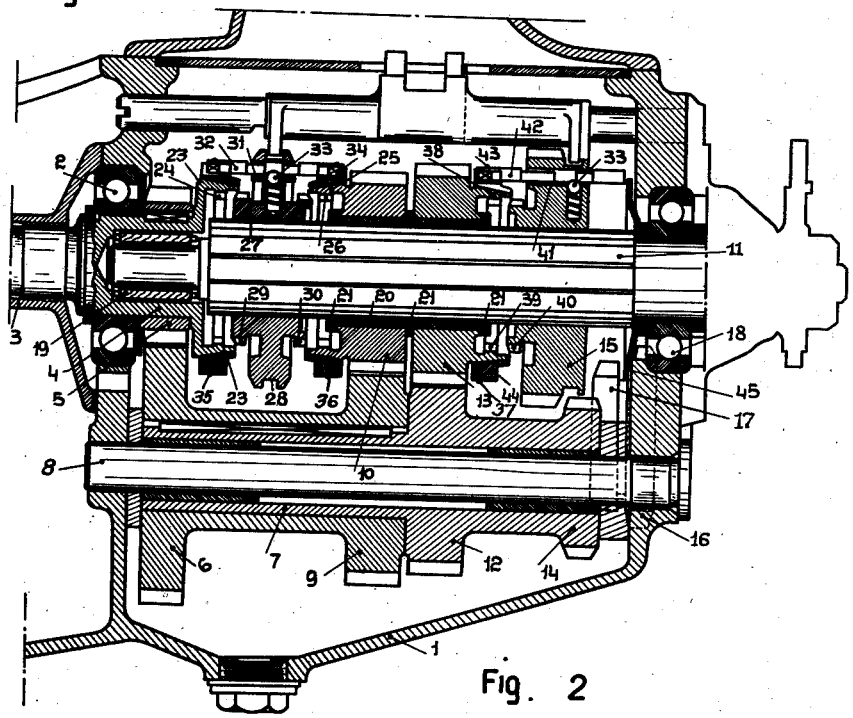
Figure 1 is an axial vertical section of the change speed gear.

Referring to the drawings, I denotes a variable speed gear box, which supports by means of a ball bearing 2 the driving shaft 3 on the cup-shaped end 4 whereof a pinion 5 is keyed which constantly meshes with a toothed wheel 6 keyed on the secondary shaft 7 loosely mounted on the fixed shaft 8 supported by the box 1. A toothed wheel 9 is solidly connected with the toothed wheel 6 and constantly meshes with the toothed wheel 10 for the third gear loosely mounted on the driven shaft 11. The secondary shaft 7 carries solidly attached thereto a pinion 12 which constantly meshes with the toothed wheel 13 for the second gear also loosely mounted on the driven shaft 11, and a pinion 14 with which the toothed wheel 15 for the first gear can be brought into engagement. This wheel 15 is mounted capable of axial displacement on the driven shaft 11 but kept from rotation thereon. The reverse gear is obtained by displacing the toothed wheels 16 and 17 solidly connected together and bringing them into mesh with the pinion 14 and the toothed wheel 15, respectively.

The driven shaft 11 is supported by the ball bearing 18 mounted on the rear wall of the box 1 and by a roller bearing 19 situated in the cup 4 of the driving shaft 3. The toothed wheels 10 and 13 are supported by the driven shaft 11 through sleeves 20 which are kept from axial displacement by means of retaining collars 21 mounted on the driven shaft 11.

The driving shaft 3 carries at its end a friction cone 23 provided with an inner set of clutch teeth 24. Also the toothed wheel 10 for the third gear carries a friction cone 25 provided with an inner set of clutch teeth 26.

A clutch element 27 is mounted on the driven shaft 11, capable of axial displacement but kept from rotation thereon, and is formed with a groove 28 adapted to receive an operating fork, and with sets of clutch teeth 29 and 30 which can be brought into engagement with the clutch teeth 24 and 26, respectively.

An internally conoidal friction clutch element in the form of a ring 35 is arranged to cooperate with the friction cone 23 to constitute therewith a friction rotary driving coupling between driving shaft 3 and driven shaft 11. A similar friction clutch ring 36 is arranged to cooperate with the friction cone 25 to constitute therewith a friction rotary driving coupling between the shaft 11 and third speed gear 10. Said two rings 35 and 36 constitute intermediate synchronizing elements or synchronizers and in cooperation with the said friction cones 23 and 25 operate to synchronize the speeds of shafts 3 and 11 on the one hand and of shaft 11 and gear 10 on the other.

For the purpose of connecting the friction rings 35 and 36 to the double positive clutch element 27 so that they must rotate therewith the latter is provided with openings or seats which, for convenience of manufacture may be round holes 31, the axes of which are parallel to the axis of the driven shaft 11. Push rods 32 are slidably disposed in these openings 31. The opposite ends 34 and 34a of the push rods are connected respectively to synchronizer rings 35 and 36. The push rods are connected to the synchronizer rings in such manner that there can be no sliding movement between rings and push rods lengthwise of the rods; but the rods may move angularly in a substantially tangential plane with respect to the rings, as occurs when one ring or the other is caused to rotate relatively to the clutch element 27.

A suitable connection between push rods and synchronizer rings may comprise rectangular notches 35a and 36a formed in the peripheries of the rings to receive the flattened or substantially rectangular ends 34 and 34a of the push rods as shown. To prevent relative longitudinal movements of push rods 32 with respect to synchronizer rings 35 and 36 such as to cause the rods to pull out from the notches, the ends of the push rods are transversely grooved as indicated at 37a, corresponding circumferential grooves 37b are formed in the outer periphery of the rings and a locking ring 37 of wire or the like is seated in the grooves 37a and 37b of push rods and synchronizer rings.

The push rods 32 are formed with three longitudinally spaced portions 321, 322 and 323 which are of cross-sectional form and area corresponding approximately to the cross-sectional form and area of the openings or rod seats 31 in clutch element 27. As the openings 31 are cylindrical, as shown, the portions 321, 322 and 323 are of a size and corresponding contour to slide and be guided in said openings with an easy fit whenever the axes of the push rods are parallel with the axes of the openings. The middle portion 321 functions as a cramping or wedging member during synchronizing action and the portions 322, 323 as guide members. In the construction shown in the drawings these portions 321, 322, 323 are segments of cylinders the inner sides, nearest the axis of shaft 11, being flattened as shown at 324. The connecting portions 325 of rod 32, between the middle portion 321 and the side portions or guide members 322 and 323, are reduced in cross-sectional area for a purpose to be stated presently. The ends 34 and 34a are connected to the side portions or guide members 322 and 323, respectively, by necks 326, 326a of reduced thickness.

Centrally disposed in the inner side of the cramping member 321 a notch 328 occurs which cooperates with a spring actuated latch 33 to yieldably retain the rod 32 centered in neutral position, in which neither ring 35 nor ring 36 is in frictional contact with the surfaces of cones 23 or 25, but is separated therefrom at least a distance equal to the thickness of a substantial oil film.

Figure 2:
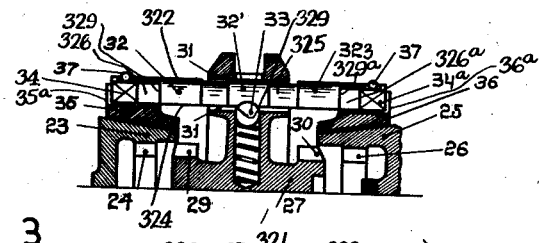
Figure 2 shows a detail of the synchronizing member on a larger scale.
Figure 3:
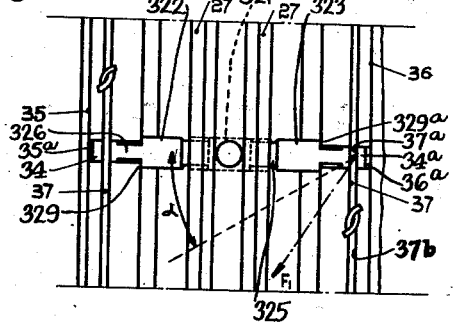
Figure 3 is a plan view.

The cramping member 321 is of a length considerably less than the length of the opening 31, as shown, and may be preferably of somewhat less diameter. When the cramping member is disposed wholly within the opening 31 of positive clutch element 27 (as it is when in neutral position or at the beginning of a shifting operation from neutral) a substantial cramping movement of rod 32 is allowed because the reduced portions 325 are within the end portions of the opening 31 as shown in Fig. 2. But when the teeth of positive clutch element 27 are adjacent to or interlocked with the teeth of either of the corresponding positive clutch elements the cramping member 321 and one of the guide parts 322 or 323 are both within the opening 31. The reduced necks 326 and 326a permit angular motion of rods 32 with respect to the synchronizer rings as described, it being understood that the ends 34, 34a are loosely fitted in the notches 35a and 36a. The shoulders 329 and 329a at the outer ends of the guide members 322 and 323 are arranged to bear against the rings 35 and 36 and exert strong pressure against said rings during synchronizing operations.

The toothed wheel 13 for the second gear is provided with a friction cone 38 having an inner set of clutch teeth 39 adapted to engage with a set of clutch teeth 40 integral with the toothed wheel 15; this wheel has a circular row of axial holes 41, in which push rods 42 are slidably mounted.

Each of the push rods 42 has an end 43 shown as substantially rectangular in section engaging a corresponding notch on the periphery of the intermediate member 44 in the form of a friction ring cooperating with the friction cone 38.

The opposite ends of the push rods 42 cooperate with a stop disc 45 carried by the driven shaft 11; the push rods 42 are kept in a centered position by means of resilient latches 33 and are connected with the intermediate member by means of a retaining ring 37, in the same manner as are push rods 32.

In operation, when the movable clutch element is displaced axially, the push rods mounted thereon are carried along and the intermediate member or synchronizer on the advancing side of said movable clutch element is caused to engage its cooperating cone. If the cone rotates faster than the intermediate member, it tends to carry along in rotation the intermediate member by a force $F_1$ which is a function of the friction clutch pressure and of the relative speed of the cone with respect to that of the intermediate member.

If the tangential component of this force, applied to the end of the push rods is great enough, namely if the force $F_1$ forms with the axes of the push rods a sufficiently wide angle, it causes wedging of the push rods in their seats and thereby prevents any further axial displacement of the movable clutch element; at the same time the intermediate member produces a braking action on the friction cone assuming that the cone is rotating faster than the intermidate member. The friction cone tends therefore to slow down, and the tangential component is thereby decreased, hence the angle of the force $F_1$ becomes smaller. When this angle falls beneath a limit value $\alpha$, the wedging force on the push rods becomes so small that the rods are capable of sliding in the openings or seats of the element 27 and the further displacement of the movable clutch element towards its clutching— in position becomes possible owing to the fact that friction passes from its static value (friction of rest) to its kinetic value (friction of motion), which is much lower. The angle $\alpha$ is a function of the friction force and of the ratio $$\frac{L}{l}$$

wherein $L$ is the distance between the surface of support on member 321 of the push rods in their seats and the points to which the friction force is applied, and $l$ is the length of the said surface of support. In the example shown this angle $\alpha$ varies between 30° and 35°.

Assuming that it is desired to throw in the third gear, the clutch element 27 is moved to the right; the resilient latches 33 carry along the push rods 32 to the right and force the intermediate member 36 on the friction cone 25 solidly connected with the toothed wheel 10 for the third gear. The friction between the intermediate member and the friction cone generates a torque which tends to rotate the toothed wheel 10 at the same speed as the clutch element 27. This torque is resolved at the ends of the push rods into forces $F_1$ which form with the axis of said push rods an angle considerably larger than the angle $\alpha$. The push rods 32 are thus locked against axial movement in their seats and the effort exerted by the operating lever on the clutch element 27 is transmitted through said push rods to the friction cone 25.

As soon as the toothed wheel 10 has attained the same speed as the clutch element 27, the torque tending to cramp the push rods in their seats is annulled and the forces $F_1$ form together with the axis of the push rods an angle smaller than $\alpha$. The push rods are thus set free and the small resistance opposed by the resilient latches 33 cannot prevent the clutch element 27 from moving further to bring the clutch teeth 30 into engagement with the clutch teeth 26. Before this engagement takes place the cylindrical guide member 323 of each push rod 32 enters one end of the hole or seat 31. The push rods are then guided by contacting surfaces of considerable length and the latches 33 are retracted from their notches. Accordingly, the push rods 32 no longer exert any effort on the intermediate member 36; the friction between the intermediate member 36 and the friction cone 25 becomes therefore negligible and the toothed wheel 10 and the clutch element 27 are free to rotate relatively to each other through a small angle, to exactly throw into mesh the clutch teeth.

When the shifter fork is operated to withdraw the clutch element 27 from its position of engagement with third speed gear 10 as shown in Fig. 4 and to move the shiftable elements into neutral position, push rods 32 are carried by the element 27 until the friction ring 35 is stopped because of the engagement of its friction surface with the surface of friction cone 23. Positive clutch element 27 continues its movement toward neutral, sliding over the rods 32, which are now prevented from cramping in the seats 31 because the surfaces of parts 321 and 323 are now guiding the rods. When the element 27 reaches neutral position each ball latch 33 will have reached a position in which its center overhangs the edge of its notch 328 in the respective rods 32, and the spring pressure acting upon the latch 33 will cause the latter to act as a cam and force the rod to neutral position where it will be held centered with respect to element 27 by the complete engagement of latch 33 in its seat 328.

The mode of operation in shifting from one speed train to another described applies to the top gear and to the second gear. The stresses imposed upon the push rods are extremely small, and as soon as these push rods begin to slide, said forces become negligible and no wear of the rods is to be feared.

In order to facilitate a clear understanding of the specific nature of the push rods a numeric example is given, in which the axial and tangential components of forces F₁ are separately analyzed.

Consider again the intermediate synchronizer element 36 carried along by the movable element 27 by means of the push rods 32 forced by the spring latches 33 into contact with the friction cone 25. The contact between the elements 25 and 36, which are supposed to turn at different speeds, produces a friction moment which is transformed into tangential reactions applied to the ends of the push rods 32. Referring to Figures 4 and 5, if each push rod transmits to the synchronizer 36 an axial thrust A, the tangential reaction T on each push rod will be:

$$T = \frac{Af \cdot D_1}{\sin \beta \cdot D_2}$$

where $f$ is the friction coefficient between the conical surfaces of the members 36 and 25, $\beta$ the cone angle, $D_1$ the middle diameter of the conical surfaces, and $D_2$ the diameter on which lie the axes of the push rods. Assuming $f=0.07$, $\sin \beta = .0863$ and $D_1/D_2 = 0.95$ we have $T = 0.77 A$.

Since the push rods are connected in a non-rigid manner to the synchronizer ring (Fig. 5) it will be seen that the force T, applied to the ends of the push-rods perpendicularly to their axes is balanced by forces C and D applied in proximity to the ends of the portion 321 guided in the hole 31. That is to say the push rods act relatively to the forces perpendicular to their axes, in the way of balanced levers owing to the action of the forces T C D. It is apparent that the shorter the lever arm between C and D relatively to the lever arm between T and C, the greater will be, relatively to the force T, the forces C and D, the friction components of which oppose the sliding movement of the movable element 27 relatively to the push rods. Assuming, with reference to Fig. 5 and continuing the numeric example, that the distance between the forces T and C be equal to four times the distance between C and D, the following force values result:

$$C = 5T; \ D = 4T; \ C + D = 9T$$

If the coefficient of friction between push rod 32 and seat 31 at the beginning of the movement is 0.16, the total friction resistance will be $$0.16 \times 9T = 1.44T$$

However T, in the preceding example, is equal to 0.77A, so that the total friction resistance will be $1.44 \times 0.77A = 1.1A$, that is to say it will be higher than the stress A transmitted by the movable element 27 to the member 36 through the push rod; it is thus clear that whatever the axially directed force acting on the movable element 27 may be, the displacement of this latter is prevented only by the friction of the push rods. As soon as the cone 25 has acquired the same speed as the synchronizer element 36, the forces T, C, D and the friction between push rod and seat are annulled, so that the movable element 27, overcoming the resistance of the spring latch 33, moves quickly toward the companion clutch element 26.

It is apparent from the preceding example, in which it is assumed that the spring latch acts only to ensure the initial contact of the friction conical surfaces, that it is possible to obtain, by friction resistance only, a positive stopping of the movable element until the synchronization is completed.

It will be obvious that the form and constructional details as well as the number and arrangement of synchronized speeds may be varied according to practical requirements, without departing from the spirit of this invention.

What I claim is:

1. Clutch mechanism comprising, in combination with a fixed clutch element and a movable clutch element, a friction surface on said fixed clutch element, a friction ring adapted to be engaged by said friction surface, push rods in the form of rods slidably mounted in seats of the movable clutch element, said rods having at least one end engaged by peripheral notches on said friction ring, yieldable latches in said seats adapted to be engaged by notches on said rods to maintain the latter centered in their seats and a retaining ring to maintain the ends in their notches on the friction ring.

2. Clutch mechanism comprising, in combination with a fixed clutch element and a movable clutch element, a friction cone rigidly connected with said fixed clutch element, a friction ring adapted to be brought into engagement with said friction cone, push rods slidably mounted in a circular row of holes formed on said movable clutch element and having at least one end substantially rectangular in section engaged by notches on the periphery of said friction ring, a retaining ring to prevent said ends rectangular in section from slipping away from the corresponding notches, and retaining latches controlled by springs and engaged by notches on said rods to keep these resiliently centered.

3. Clutch mechanism comprising, in combination with a fixed clutch element and a movable clutch element, a friction surface on said fixed clutch element, a friction ring adapted to be brought into engagement with said friction surface, push rods slidably mounted in holes of one of said clutch elements, said push rods having a portion shorter than the hole which portion is guided in the hole in the neutral position and at least one side portion which does not cooperate with the hole surface in the neutral position, but comes into action for guiding the push rod on a greater length when the said push rod is removed from its neutral position, yieldable latches in said holes adapted to be engaged by notches on said push rods to maintain the latter centered and means for positively connecting the ends of said push rods with said friction ring.

4. Clutch mechanism comprising, in combination with a fixed clutch element and a movable clutch element, the latter having axially extending parallel-sided seats therein, a friction surface on said fixed clutch element, a friction ring adapted to be brought into engagement with said friction surface, push rods slidable in the parallel-sided seats formed in said movable clutch element and cooperating with said friction ring in such a manner that as long as said clutch elements turn at different speed, they are wedged in their seats tending to prevent the engagement of the clutch elements with each other.

5. A clutch mechanism comprising a first clutch element, a friction surface non-rotatably associated therewith, a second coaxial clutch element axially slidable relatively to said first clutch element, a friction synchronizer element to engage said friction surface to synchronize the speed of said first clutch element with the speed of said second clutch element preparatory to positively clutching the two together, push rods axially slidably connecting said friction synchronizer element with said second clutch element, yieldable means for holding said second clutch element and said friction synchronizer element from relative axial movement when unclutched, said push rods being so related to the friction synchronizing element and said second clutch element that the forces, imparted to them by said friction synchronizer element when in contact with said friction surface during rotation, are balanced by multiplied forces between said push rods and said second clutch element, whereby the frictional components of said multiplied forces prevent the relative axial displacement of said friction synchronizer element and said second clutch element until synchronization is accomplished.

6. A clutch mechanism comprising a first clutch element and a coaxial second clutch element, means for positively clutching said elements together, a friction surface non-rotatably associated with said first clutch element, a friction synchronizer element adapted to engage said friction surface, push rods axially slidable on said second clutch element, means for establishing a connection between said push rods and said friction synchronizer element, said push rods and said connection being such that the forces, caused by synchronization, imparted through said friction synchronizer element to said push rods perpendicularly to their axes are balanced by forces, greater than the first named forces, between said push rods and said second clutch element, whereby said push rods and said second clutch element are frictionally locked against relative axial displacement until synchronization is reached, and means for yieldably holding said push rods axially centered on said second clutch element when in neutral position.

7. A clutch mechanism comprising an axially fixed clutch element, a friction surface non-rotatably connected therewith, a coaxial movable clutch element, a friction synchronizer element adapted to engage said friction surface, push rods axially slidable on said movable clutch element, having their outer ends adapted for non-rigid connection with said friction synchronizer element, said push rods being so constructed that when the synchronizing torque on said friction synchronizer element is resolved into forces imparted to their ends, said push rods, acting as levers, exert multiplied forces upon said movable clutch element, the frictional components of the last named forces preventing said movable clutch element from axial displacement, means for yieldably holding said push rods axially centered on said movable clutch element when unclutched, and means for limiting the axial displacement of said synchronizer friction element away from said friction surface.

8. A clutch mechanism comprising a first clutch element and a coaxial second clutch element, means for positively clutching the two together, a friction surface non-rotatably associated with said first clutch element, a friction synchronizer element adapted to engage said friction surface, push rods axially slidable on said second clutch element, means for establishing a connection between said push rods and said friction synchronizer element, said push rods being so constructed that when in the unclutched position the portion of said push rods guided on said second clutch element is axially shorter than the portion of said push rods guided in said second clutch element when removed from the unclutched position, and means for yieldably holding said push rods axially centered when in said unclutched position.

9. A clutch mechanism comprising a first clutch element and a second coaxial clutch element, means for positively clutching the two together, a friction surface non-rotatably associated with said first clutch element, a friction synchronizer element to engage said friction surface, push rods axially slidable on said second clutch element, said push rods having their outer ends non-rigidly connected with said friction synchronizer element, and means for resiliently holding said push rods axially centered on said second clutch element when unclutched.

10. A clutch mechanism comprising an axially fixed clutch element, a friction surface fixedly connected therewith, a movable clutch element, a friction synchronizer element to engage said friction surface, said synchronizer element being provided with notches, push rods slidably mounted on the movable clutch element, said rods having notches and having at least one end adapted to be engaged by the notches in said friction synchronizer element, yieldable latches in said movable clutch element to be engaged by the notches in said rods to maintain the latter centered, and retaining means to hold the ends of said rods in their notches on the friction synchronizer element.

11. A clutch mechanism comprising an axially fixed clutch element, a friction surface rigidly connected therewith, a movable clutch element provided with seats, a friction synchronizer element to engage said friction surface, push rods slidably mounted in the seats in the movable clutch element, said push rods being formed with notches and each having a portion shorter than the seat, which portion is guided in the seat in the neutral position and at least one side portion which does not cooperate with the seat in the neutral position but comes into action for guiding a longer section of the push rod when said push rod is removed from the neutral position, yieldable latches in said seats to be engaged by the notches on said push rods to maintain the latter centered and means for connecting the ends of said push rods with said friction synchronizer element.

12. A clutch mechanism comprising a fixed clutch element, a friction cone rigidly connected therewith, a movable clutch element provided with seats, a friction ring to engage said friction cone, said ring having substantially rectangular notches formed therein, push rods slidably mounted in the seats formed in said movable clutch element and having at least one end rectangular in section engaged by the notches in said friction ring, said rods being formed with notches, a retaining ring to prevent said ends rectangular in section from slipping away from the corresponding notches and retaining latches controlled by springs and arranged to engage the notches in said rods to keep the rods resiliently centered.

13. A composite frictional and positive clutch comprising positive clutch elements adapted to be engaged and disengaged by a relative axial movement, one of said elements having axially extending parallel-sided rod seats; cooperating friction clutch elements, one of which is a synchronizer element having a driving connection with the positive clutch element that is provided with rod seats, said driving connection comprising push rods adapted to move axially in said seats and to permit said positive clutch element provided with said seats to move axially with respect to said push rods, said push rods being non-slidably connected to said synchronizer element so as to be capable of angular movement in planes tangent to the synchronizer element at the points of connection thereto of said push rods.

14. A clutch mechanism comprising two positive clutch elements axially movable relatively into or out of engagement one with the other; a friction clutch element in fixed relation to one of said positive clutch elements; a friction synchronizer element having a friction surface adapted to engage with the friction surface of said first-named friction clutch element; push rods operatively connecting said friction synchronizer element with said other positive clutch element, each push rod being axially slidable in seats in one of said last-named elements and connected to the other so as to swing tangentially but resist axial movement with respect to said other element; the operative connections of said push rods being such that the forces caused by the act of synchronization imparted through said friction synchronizer element to said push rods transversely of their axes are balanced by forces, greater than said transversely imparted forces, reacting between said push rods and that element having the seats in which said push rods are slidable; whereby said push rods and said element having the push rod seats are frictionally locked against relative axial displacement until synchronization is attained.

FERDINAND CHARLES REGGIO.